(12) United States Patent
Mongeon (10) Patent No.: US 7,872,776 B2
(45) Date of Patent: *Jan. 18, 2011

(54) METHODS, SYSTEMS AND APPARATUS TO CONTROL HUE VARIATION FOR MULTIPLE MARKING ENGINE PRINTING SYSTEMS

(75) Inventor: Michael C. Mongeon, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 211 days.

This patent is subject to a terminal disclaimer.

(21) Appl. No.: 12/261,312

(22) Filed: Oct. 30, 2008

(65) Prior Publication Data

US 2009/0296111 A1 Dec. 3, 2009

Related U.S. Application Data

(60) Provisional application No. 61/056,080, filed on May 27, 2008.

(51) Int. Cl.
*G03F 3/08* (2006.01)
*G06F 15/00* (2006.01)

(52) U.S. Cl. .................. 358/1.9; 358/504; 358/515; 358/518; 358/520; 358/525

(58) Field of Classification Search .................. 358/1.1, 358/1.9, 2.1, 504, 515, 518, 520, 525
See application file for complete search history.

(56) References Cited

U.S. PATENT DOCUMENTS

| 4,710,785 | A | 12/1987 | Mills |
| 5,510,896 | A | 4/1996 | Wafler |
| 5,884,118 | A | 3/1999 | Mestha |
| 6,418,281 | B1 | 7/2002 | Ohki |
| 7,027,187 | B1* | 4/2006 | Zuber .................. 358/1.9 |
| 7,382,993 | B2 | 6/2008 | Mongeon et al. |
| 2003/0164960 | A1* | 9/2003 | Housel ............... 358/1.9 |
| 2004/0183814 | A1* | 9/2004 | Saito .................. 345/601 |
| 2005/0018225 | A1* | 1/2005 | Nishikawa ........... 358/1.9 |
| 2007/0097461 | A1* | 5/2007 | Ng et al. ............. 358/504 |
| 2008/0144141 | A1* | 6/2008 | Tai et al. ............ 358/518 |
| 2008/0205933 | A1* | 8/2008 | Takeuchi ............ 399/151 |
| 2009/0244573 | A1* | 10/2009 | Seto ................... 358/1.9 |

OTHER PUBLICATIONS

U.S. Appl. No. 11/962,568, filed Dec. 21, 2007, Mongeon.

* cited by examiner

*Primary Examiner*—Kimberly A Williams
(74) *Attorney, Agent, or Firm*—Fay Sharpe LLP (57) ABSTRACT

Disclosed are methods, systems and apparatus to control hue variation for multiple marking engine printing systems. According to one exemplary method, hue variations associated with two or more color marking engines is controlled by adjusting a color separation error envelope which quantifies color separation error differences between the two or more color marking engines.

25 Claims, 7 Drawing Sheets

METHODS, SYSTEMS AND APPARATUS TO CONTROL HUE VARIATION FOR MULTIPLE MARKING ENGINE PRINTING SYSTEMS

This application claims the priority benefit of U.S. provisional application Ser. No. 61/056,080, filed May 27, 2008, the disclosure of which is totally incorporated herein by reference.

CROSS REFERENCE TO RELATED PATENTS AND APPLICATIONS

U.S. Pat. No. 7,382,993, issued Jun. 3, 2008, entitled "PROCESS CONTROLS METHODS AND APPARATUSES FOR IMPROVED IMAGE CONSISTENCY," by Mongeon et al., and U.S. patent application Ser. No. 11/962,568, filed Dec. 21, 2007, entitled "COLOR IMAGE PROCESS CONTROLS METHODS AND SYSTEMS," by Michael Mongeon, are totally incorporated herein by reference in their entirety.

BACKGROUND

The following disclosure relates to printing systems. It finds particular application in conjunction with adjusting image quality in print or marking systems with multiple electrophotographic or xerographic print engines. However, it is to be appreciated that the presently disclosed exemplary embodiments are also amenable to other like applications.

Typically, in image rendering or printing systems, it is desirable that a rendered or printed image closely match, or have similar aspects or characteristics to a desired target or input image. However, many factors, such as temperature, humidity, ink or toner age, and/or component wear, tend to move the output of a printing system away from the ideal or target output. For example, in xerographic marking engines, system component tolerances and drifts, as well as environmental disturbances, may tend to move an engine response curve (ERC) away from an ideal, desired or target engine response and toward an engine response that yields images that are lighter or darker than desired.

For printing systems which include multiple printing engines, the importance of engine response control or stabilization is amplified. Subtle changes that may be unnoticed in the output of a single marking engine can be highlighted in the output of a multi-engine image rendering or marking system. For example, the facing pages of an opened booklet rendered or printed by a multi-engine printing system can be printed by different engines. For instance, the left-hand page in an open booklet may be printed by a first print engine while the right-hand page is printed by a second print engine. The first print engine may be printing images in a manner slightly darker than the ideal and well within a single engine tolerance; while the second print engine may be printing images in a manner slightly lighter than the ideal and also within the single engine tolerance. While a user might not ever notice the subtle variations when reviewing the output of either engine alone, when the combined output is compiled and displayed adjacently, the variation in intensity from one print engine to another may become noticeable and be perceived as an issue of quality by a user.

One approach to improve consistency among multiple engines is for a user to periodically inspect the print quality. When inconsistency becomes noticeable, the user initiates printing of test patches on multiple engines and scans the test patches. The scanner reads the test patches and adjusts the xerography of the engines to match. However, this approach requires user intervention and a scanner to scan the test patches. Another approach to improve image consistency among multiple engines is to print test patches with each engine of the multiple engine system and compare the test patches against one another. However, such an approach is complex as it involves substantial software development as well as elaborate scheduling of test patches to not interfere with the print job.

In addition to the variation of the overall engine response, as discussed above, variations in the color separations of a color printing system may contribute to hue shifts associated with a printed output. These variations may occur over time and result in a reduction in perceived color accuracy of a printed output.

This disclosure provides methods, systems and apparatus to control hue variation for multiple marking engine printing systems.

INCORPORATION BY REFERENCE

The following patents and patent applications, the disclosures of each being totally incorporated herein by reference are mentioned:

U.S. Pat. No. 4,710,785, which issued Dec. 1, 1987 to Mills, entitled "PROCESS CONTROL FOR ELECTROSTATIC MACHINE," discusses an electrostatic machine having at least one adjustable process control parameter.

U.S. Pat. No. 5,510,896, which issued Apr. 23, 1996 to Wafler, entitled "AUTOMATIC COPY QUALITY CORRECTION AND CALIBRATION," discloses a digital copier that includes an automatic copy quality correction and calibration method that corrects a first component of the copier using a known test original before attempting to correct other components that may be affected by the first component.

U.S. Pat. No. 5,884,118, which issued Mar. 16, 1999 to Mestha, entitled "PRINTER HAVING PRINT OUTPUT LINKED TO SCANNER INPUT FOR AUTOMATIC IMAGE ADJUSTMENT," discloses an imaging machine having operating components including an input scanner for providing images on copy sheets and a copy sheet path connected to the input scanner.

U.S. Pat. No. 6,418,281, which issued Jul. 9, 2002 to Ohki, entitled "IMAGE PROCESSING APPARATUS HAVING CALIBRATION FOR IMAGE EXPOSURE OUTPUT," discusses a method wherein a first calibration operation is performed in which a predetermined grayscale pattern is formed on a recording paper and this pattern is read by a reading device to produce a LUT for controlling the laser output in accordance with the image signal (gamma correction).

BRIEF DESCRIPTION

In one embodiment of this disclosure, a method of controlling hue variation associated with a first color IME (Image Marking Engine) and a second color IME having one or more substantially equivalent color separations is disclosed. The method of controlling hue variation comprises a) printing a control patch for each color separation associated with the first and second IMEs, the control patches associated with the actual rendering of respective target separation colors and based on a respective marking density correlated with the target separation colors; b) measuring color separation errors associated with the control patches relative to the respective target separation colors; c) determining a first color separation and a second color separation which define the limits of an error range associated with color separation error differences between the first and second IMEs for each color separation; and d) decreasing the target color error associated with the first and second color separations by adjusting the marking density of the first and second color separations associated with the first and second IMEs to decrease the color separation error range between the first and second IMEs.

In another embodiment of this disclosure, an image rendering system is disclosed which comprises two or more color IMEs; and a controller, the controller configured to execute the method comprising a) printing a control patch for each color separation associated with the first and second IMEs, the control patches associated with the actual rendering of respective target separation colors and based on a respective marking density correlated with the target separation colors; b) measuring color separation errors associated with the control patches relative to the respective target separation colors; c) determining a first color separation and a second color separation which define the limits of an error range associated with color separation error differences between the first and second IMEs for each color separation; and d) decreasing the target color error associated with the first and second color separations by adjusting the marking density of the first and second color separations associated with the first and second IMEs to decrease the color separation error range between the first and second IMEs.

In still another embodiment of this disclosure, a computer program product is disclosed. The computer program product comprises a computer-usable data carrier storing instructions that, when executed by a computer, cause the computer to perform a method of controlling hue variation associated with a first color IME and a second color IME having one or more substantially equivalent color separations, the method comprising a) printing a control patch for each color separation associated with the first and second IMEs, the control patches associated with the actual rendering of respective target separation colors and based on a respective marking density correlated with the target separation colors; b) measuring color separation errors associated with the control patches relative to the respective target separation colors; c) determining a first color separation and a second color separation which define a respective maximum and minimum of the error range associated with color separation error differences between the first and second IMEs for each color separation; and d) decreasing the target color error associated with the first and second color separations by adjusting the marking density of the first and second color separations associated with the first and second IMEs to decrease the color separation error range between the first and second IMEs.

DETAILED DESCRIPTION

As briefly discussed in the background, this disclosure provides method, systems and apparatus to control hue variation for multiple marking engine printing systems. The exemplary embodiments disclosed provide system level processes for matching two color engines. The processes build on algorithms for monochrome integrated printing system control as described in U.S. Pat. No. 7,382,993, issued to Mongeon et al., for each color separation, but additionally tests separation to separation consistency, constraining the "envelope" of midtone errors to a controlled level. This control strategy forces color errors towards a chroma shifts and avoids hue shifts to maintain acceptable secondary and tertiary color consistency in a multi-engine color printing system. Advantages of this method may include reuse of existing engine process controls algorithms and sensors resident within the marking engines. Simulation results indicate 50% reduction in color error between facing pages compared to independent CMYK control of IQC.

In monochrome printing systems, engine matching is accomplished by controlling the midtone lightness error between engines ($\Delta L^*$) by adjusting patch sensor targets for each engine. This method, detailed in U.S. Pat. No. 7,382,993 can reside in production monochrome system products. This strategy, as disclosed herein, may be extended to color systems in a similar manner using $\Delta E$paper measurements in the engine. Similar to monochrome, midtones are controlled for color systems for the following reasons:

A. In most situations, the midtones are the most sensitive region of the TRC (Tune Reproduction Curve).

B. TRC variation is typically "lighter/darker," meaning the entire TRC gets lighter/darker in a predictive manner.

C. Adjustments to other regions in the TRC are predictively scaled to the midtones.

Substantively, the hue variation control methods, systems and apparatus operate as follows.

For a given separation, i, the IQC error is calculated for the midtones as follows:

$$S_i1\_err = S_i1\_meas - S_i1\_target \text{ (Separation (CMYK) Engine1 error)} \qquad 1.$$

$$S_i2\_err = S_i2\_meas - S_i2\_target \text{ (Separation (CMYK) Engine2 error)} \qquad 2.$$

$$S_i12\_err = S_i1\_err - S_i2\_err \text{ (Separation (CMYK) IQC error)} \qquad 3.$$

where the subscripts
i=separation [0,3]
1 refers to engine #1
2 refers to engine #2
12= engine to engine difference.

The magnitude of the error Si12_err is compared with a control goal, and if it exceeds this value, then each engine control target is adjusted by ½ this error. (See U.S. Pat. No. 7,382,993 to Mongeon et al.)

$$Si1\_target = Si1\_target + Si12\_err/2 \qquad 4.$$

$$Si2\_target = Si2\_target - Si12\_err/2. \qquad 5.$$

Assuming the IQC for each CMYK separation are independently controlled within control limits, the controller determines an "error envelope" and identifies the two separations with the maximum and minimum IQC error as follows:

$$i_{max} = \text{Separation}(\max(Si12\_err)) \qquad 6.$$

$$i_{min} = \text{Separation}(\min(Si12\_err)). \qquad 7.$$

Compare the envelope (range) error, ENV_err, to a control target, ENV_tar, and adjust the midtone control targets for these two separations as follows:

$$ENV_{err} = \max(Si12\_err) - \min(Si12\_err) \qquad 8.$$

If $ENV_{err}$ >ENV_tar, then

Adjust separations Imax and Imin as follows:

$$Si\text{max1\_target} = Si\text{max1\_target} - ENV\text{err}/4 \text{ (Adjust separation with max IQC\_err by reducing density of Engine 1)} \qquad 9.$$

$$Si\text{max2\_target} = Si\text{max2\_target} + ENV\text{err}/4 \text{ (Adjust separation with max IQC\_err by increasing density of Engine 2)} \qquad 10.$$

$$Si\text{min1\_target} = Si\text{min1\_target} + ENV\text{err}/4 \text{ (Adjust separation with min IQC\_err by increasing density of Engine 1)} \qquad 11.$$

$$Si\text{min2\_target} = Si\text{min2\_target} - ENV\text{err}/4 \text{ (Adjust separation with min IQC\_err by decreasing density of Engine 2).} \qquad 12.$$

Figure 1:
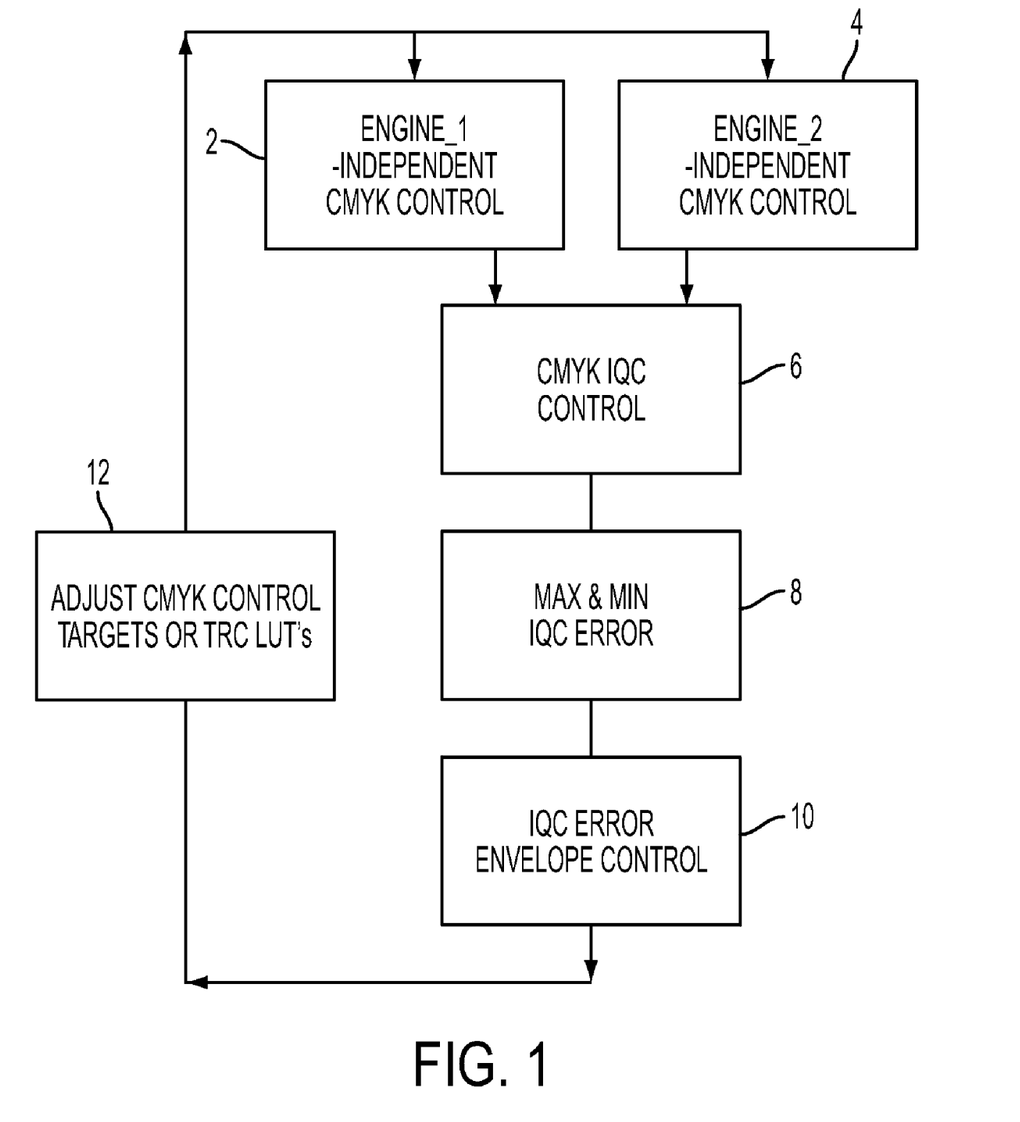
FIG. 1 is a block diagram of a printing system including a method of controlling hue variation according to an exemplary embodiment of this disclosure.

FIG. 1 is a block diagram of a color IQC controller including two color engines with independent CMYK control 2, 4 combined into an integrated printing system, where engine IQC and IQC error envelope control is imposed. A correction to each engine patch target or TRC minimizes color error.

In operation, the first IME 2 and second IME 4 are configured to control a plurality of colorants, for example CMYK, to within a specific error relative to one or more target colors.

The CMYK control represented by blocks 2 and 4 are independent from the subsequent IQC controls of blocks 6, 8 and 10. In operation, the independent CMYK controls for the IMEs process color recipes which transform target colors represented in a device independent color space, such as L*a*b*, RGB, CIE, etc. into CMYK values which control the amount of each colorant to render or print the target colors requested. Notably, to control the actual rendered or printed target color, the actual target color reference can be modified/biased and/or the color recipe can be modified/biased, for example by adjusting a LUT (look-up-table) associated with the TRC of the controlled colorant.

CMYK IQC control block 6, Max & Min IQC Error block 8 and IQC Error Envelope Control block 10 determine collectively any adjustments required of the target CMYK values or TRC LUTs to control the hue variation between the two IMEs for one or more color separations.

CMYK IQC control 6 process measures color separation errors associated with the control patches representing target colors printed by each IME.

Max & Min EQC Error 8 process determines which color separations are associated with a respective maximum and minimum color separation error difference between the first and second IMEs for each color separation.

IQC Error Envelope Control 10 process decreases the target color error difference, i.e. separation error range, between the first and second IMCs by determining the necessary adjustment required to the CMYK control targets or TRC LUTs.

CMYK control 12 process adjusts the CMYK control targets or TRC LUTs based on the output of IQC Error Envelope Control 10.

Finally, the whole process can be performed iteratively by printing target color patches based on the adjusted CMYK control targets or TRC LUTs, and repeating process control blocks 2, 4, 6, 8, 10 and 12.

Figure 2A:
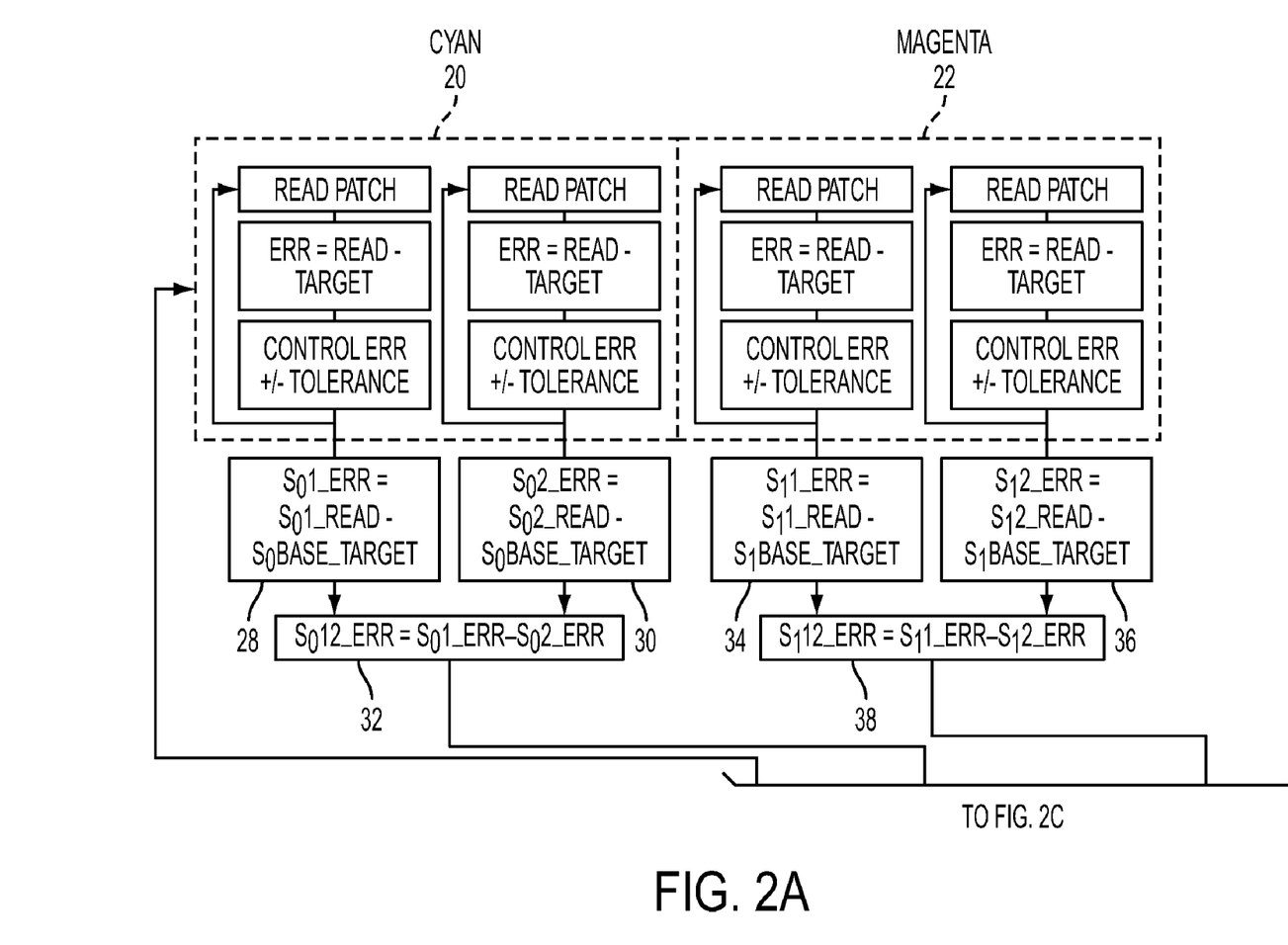
FIGS. 2A, 2B and 2C are portions of a block diagram of an image quality control system (IQC) according to an exemplary embodiment of this disclosure.
Figure 2B:
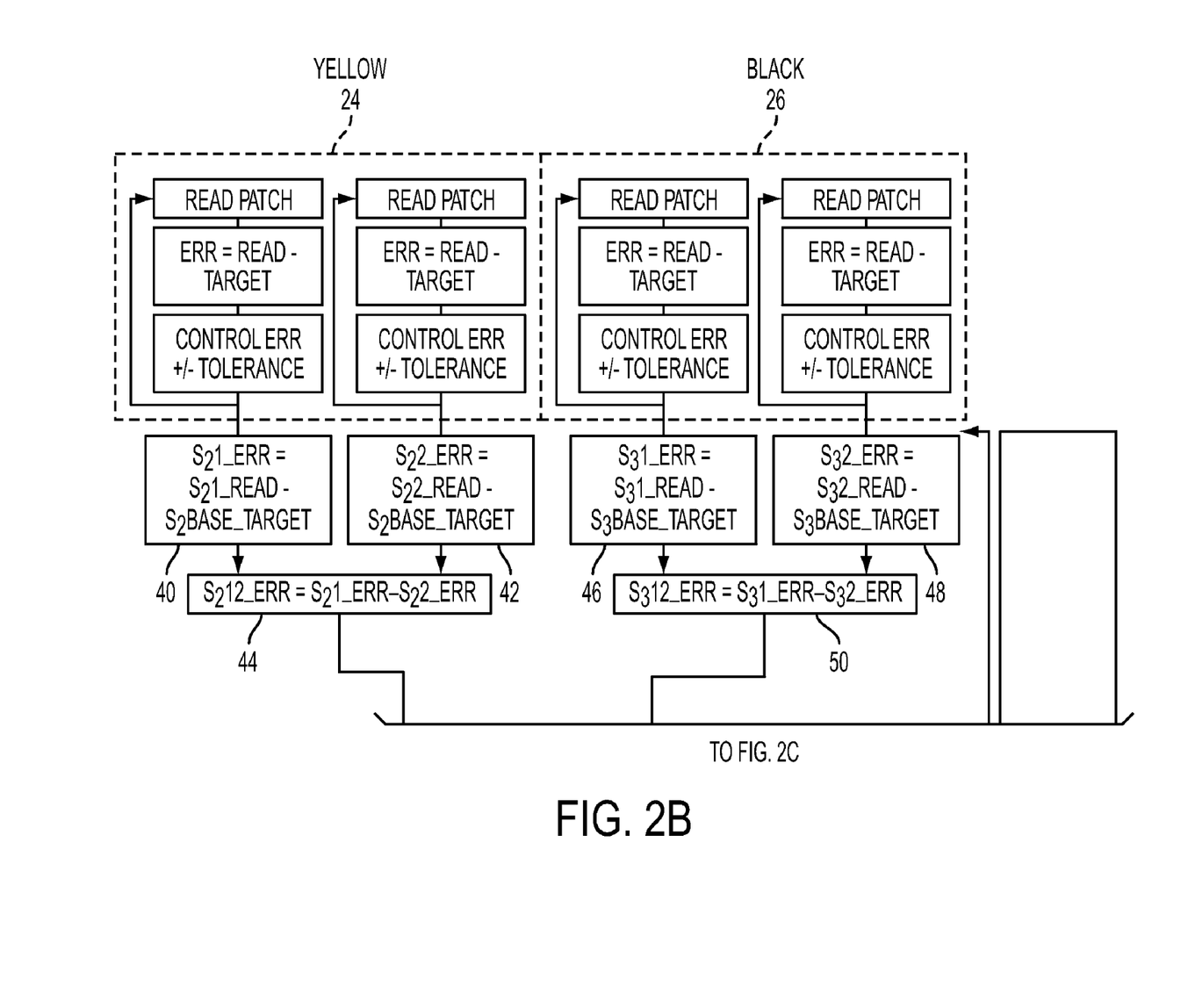
Figure 2C:
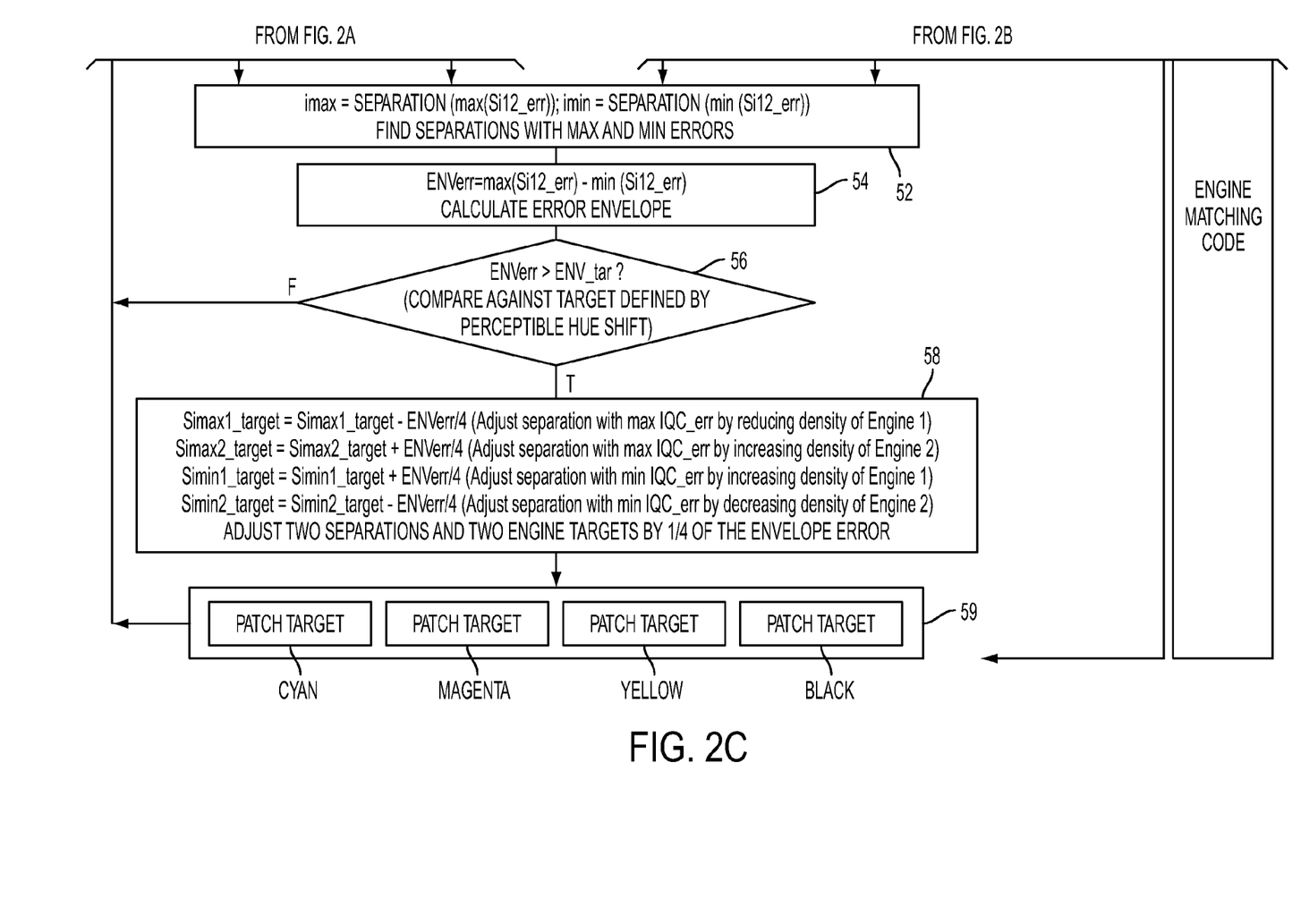

With reference to FIGS. 2A, 2B and 2C, illustrated is a flow chart detailing an exemplary process of controlling the hue variation associated with a first color IMC and a second IME have substantially equivalent color separations, i.e. colorants. The IMEs include CMYK, i.e. cyan, magenta, yellow and black toner which is xerographically applied to a media substrate such as paper. As will be understood by one of skill in the art of printing, the illustrated process, and description which follows, can be applied to two or more IMEs, for example three IMEs, four IMEs, etc., and is not limited to four colorants. Any number of colorants, for example two, three, five, six, etc. can be controlled according to the processes illustrated in FIGS. 2A, 2B and 2C and are within the scope of this disclosure and the embodiments described therein.

The IQC process operates as follows.

Initially, existing controls of the IMEs print control patches which represent target colors, this is completed in blocks 20, 22, 24 and 26 for cyan, magenta 22, yellow 24 and black 26, respectively. The existing controls read the printed patches by means of an image scanning device such as an external scanner densitometer and/or spectrophotometer. Next, the existing controls generate a color error and compare the color error to a control error tolerance which indicates whether or not the IME controller is operating within specification as related to color control. If the IME is operating out of tolerance, the IME control system is modified to generate renderings of the target color patches within the tolerance of the IME. The existing IME process controls typically adjusts the TRC via a LUT to control the toner density rendered for a specific target color, however, other means such as, but not limited to, control system gains may be modified to control the IMEs within their performance tolerances.

At process blocks 28, 30, 34, 36, 40, 42, 46 and 48, error signals are generated for each of the target color patches, i.e. cyan midtone, magenta midtone, yellow midtone, black midtone, for each IME.

Process blocks 32, 38, 44 and 50 determine the error differences for each colorant relative to both IMEs.

Process block 52 determines which colorants are associated with a maximum and minimum error range relative to the two IMEs.

Process block 54 calculates the error envelope based on the results of block 52 and process block 56 compares the error envelope to a tolerance, i.e. target, hue variation associated with the printing system.

If the printing system, i.e. both IMEs, is operating within the system tolerance, the process returns to the existing process controls for printing of images.

If the printing system is not within the system tolerance, the color separations associated with the maximum and minimum error range are adjusted to reduce the overall size of the error envelope. This is accomplished by modifying the target color patch data representation used to render the target color. Alternatively, the TRC for the colorants may be modified.

Finally, process block 59 prints target color control patches based on the modified target color patch data representations and the process returns to the existing IME controls where additional iterations can be performed to further reduce the hue variation between the two IMEs. Alternatively, the IQC process ends and the existing IME process control system operates independently of the IQC process to print images.

Figure 3:
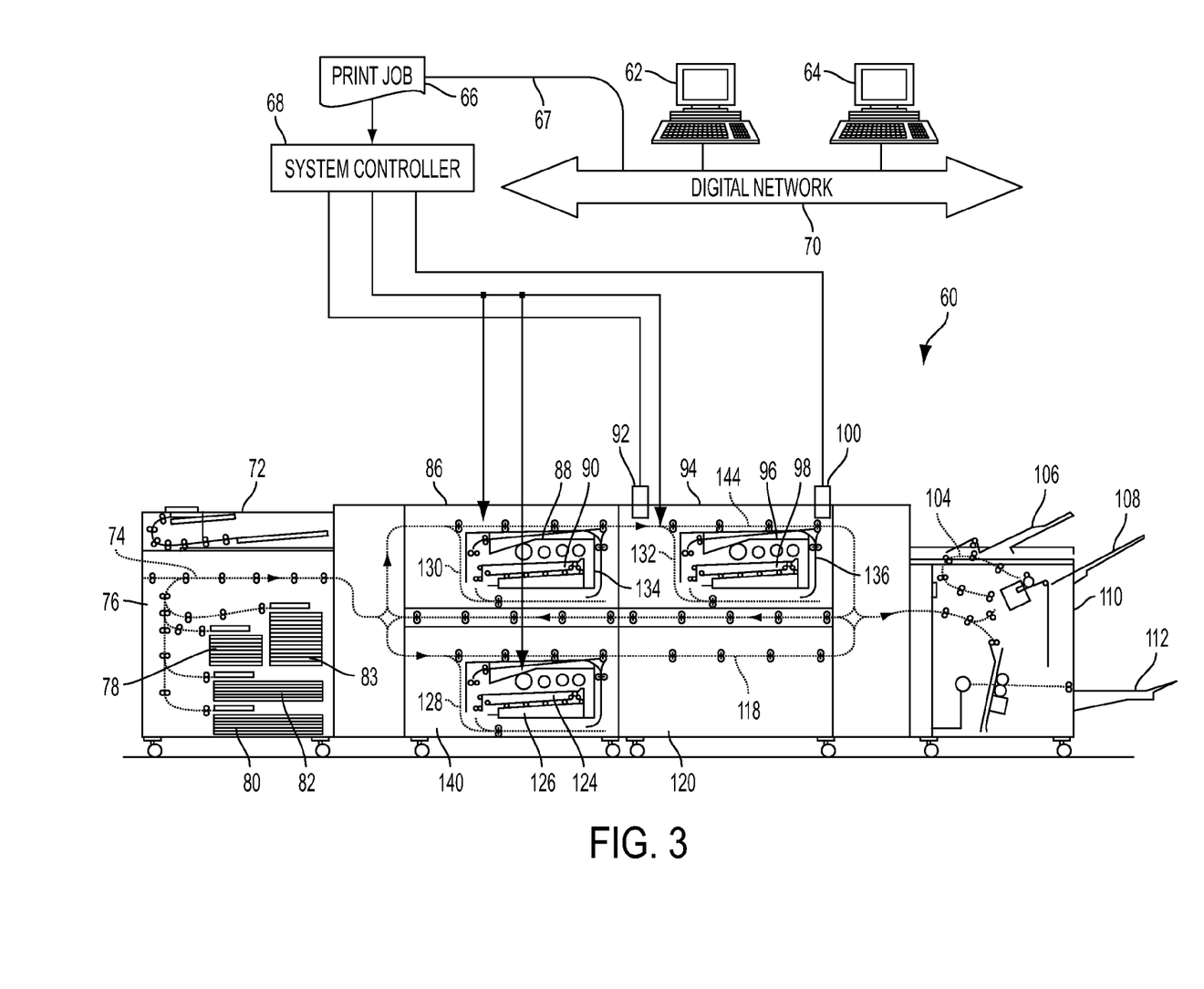
FIG. 3 illustrates an exemplary color printing system according to this disclosure.

With reference to FIG. 3, illustrated is an exemplary printing or document processing system according to this disclosure. The system includes first, second, . . . , nth marking engine processing units 86, 94, 140, . . . , each including an associated first, second, . . . , nth marking or print engines or devices 88, 96, 126 and associated entry and exit inverter/ bypasses 130, 132, and 128, respectively. Notably, the embodiment may include marking engines which are removable. For example, in FIG. 3, an integrated marking engine and entry and exit inverter/bypasses of the processing unit 120 are shown as removed, leaving only a forward or upper paper path 144. In this manner, for example, the functional marking engine portion can be removed for repair, or can be replaced to effectuate an upgrade or modification of the printing system 60.

While three marking engines 88, 96, 126 are illustrated (with the fourth marking engine being removed), the number of marking engines can be one, two, three, four, five, or more. Providing at least two marking engines typically provides enhanced features and capabilities for the printing system 60 since marking tasks can be distributed amongst the at least two marking engines. Some or all of the marking engines 88, 96, 126 may be identical to provide redundancy or improved productivity through parallel printing. Alternatively or additionally, some or all of the marking engines may be different to provide different capabilities. For example, the marking engines 96, 126 may be color marking engines, while the marking engine 88 may be a black (K) marking engine.

As discussed in detail below, a system controller 68 includes a relative reflectance determining device (i.e. sensors 92, and 100) or processor or algorithm. The system controller 68 determines the associated relative reflectance of control patches associated with each color separation. The system controller 68 analyzes the measured relative reflectance against one or more predetermined parameters target colors. Based on the analysis, an image quality control algorithm or processor or device determines what adjustment is needed, i.e., a target color is adjusted or modified by means of an actuator (i.e. 90, 98 and 124).

With continuing reference to FIG. 3, the illustrated marking engines 88, 96, 126 employ xerographic printing technology, in which an electrostatic image is formed and coated with a toner material, and then transferred and fused to paper or another print medium by application of heat and pressure. However, marking engines employing other printing technologies can be provided, such as marking engines employing ink jet transfer, thermal impact printing, or so forth. The processing units of the printing system 60 can also be other than marking engines; such as, for example, a print media feeding source or feeder 76 which includes associated print media conveying components 74. The media feeding source 76 supplies paper or other print media for printing. Another example of a processing unit is a finisher 110 which includes associated print media conveying components 104. The finisher 110 provides finishing capabilities such as collation, stapling, folding, stacking, hole-punching, binding, postage stamping, and so forth.

The print media feeding source 76 includes print media sources or input trays 78, 80, 82, 83 connected with the print media conveying components 74 to provide selected types of print media. While four print media sources are illustrated, the number of print media sources can be one, two, three, four, five, or more. Moreover, while the illustrated print media sources 78, 80, 82, 83 are embodied as components of the dedicated print media feeding source 76, in other embodiments one or more of the marking engine processing units may include its own dedicated print media source instead of or in addition to those of the print media feeding source 76. Each of the print media sources 78, 80, 82, 83 can store sheets of the same type of print media, or can store different types of print media. For example, the print media sources 80, 82 may store the same type of large-size paper sheets, print media source 78 may store company letterhead paper, and the print media source 83 may store letter-size paper. The print media can be substantially any type of media upon which one or more of the marking engines 88, 96, 126 can print, such as high quality bond paper, lower quality "copy" paper, overhead transparency sheets, high gloss paper, and so forth.

Since multiple jobs can arrive at the finisher 110 during a common time interval, the finisher 110 includes two or more print media finishing destinations or stackers 106, 108, 112 for collecting sequential pages of each print job that is being contemporaneously printed by the printing system 60. Generally, the number of the print jobs that the printing system 60 can contemporaneously process is limited to the number of available stackers. While three finishing destinations are illustrated, the printing system 60 may include two, three, four, or more print media finishing destinations. The finisher 110 deposits each sheet after processing in one of the print media finishing destinations 106, 108, 112, which may be trays, pans, stackers and so forth. While only one finishing processing unit is illustrated, it is contemplated that two, three, four or more finishing processing units can be employed in the printing system 60.

Bypass routes in each marking engine processing unit provide a means by which the sheets can pass through the corresponding marking engine processing unit without interacting with the marking engine. Branch paths are also provided to take the sheet into the associated marking engine and to deliver the sheet back to the upper or forward paper path 144 of the associated marking engine processing unit.

The printing system 60 executes print jobs. Print job execution involves printing selected text, line graphics, images, machine ink character recognition (MICR) notation, or so forth on front, back, or front and back sides or pages of one or more sheets of paper or other print media. In general, some sheets may be left completely blank. In general, some sheets may have mixed color and black-and-white printing. Execution of the print job may also involve collating the sheets in a certain order. Still further, the print job may include folding, stapling, punching holes into, or otherwise physically manipulating or binding the sheets.

Print jobs can be supplied to the printing system 60 in various ways. A built-in optical scanner 72 can be used to scan a document such as book pages, a stack of printed pages, or so forth, to create a digital image of the scanned document that is reproduced by printing operations performed by the printing system 60. Alternatively, one or more print jobs 66 can be electronically delivered to a system controller 68 of the printing system 60 via a wired connection 67 from a digital network 70 that interconnects computers 62, 64 or other digital devices. For example, a network user operating word processing software running on the computer 64 may select to print the word processing document on the printing system 60, thus generating the print job 66, or an external scanner (not shown) connected to the network 70 may provide the print job in electronic form. While a wired network connection 67 is illustrated, a wireless network connection or other wireless communication pathway may be used instead or additionally to connect the printing system 60 with the digital network 70. The digital network 70 can be a local area network such as a wired Ethernet, a wireless local area network (WLAN), the Internet, some combination thereof, or so forth. Moreover, it is contemplated to deliver print jobs to the printing system 60 in other ways, such as by using an optical disk reader (not illustrated) built into the printing system 60, or using a dedicated computer connected only to the printing system 60.

The printing system 60 is merely an illustrative example. In general, any number of print media sources, media handlers, marking engines, collators, finishers or other processing units can be connected together by a suitable print media conveyor configuration. While the printing system 60 illustrates a 2×2 configuration of four marking engines, buttressed by the print media feeding source on one end and by the finisher on the other end, other physical layouts can be used, such as an entirely horizontal arrangement, stacking of processing units three or more units high, or so forth. Moreover, while in the printing system 60 the processing units have removable functional portions, in some other embodiments some or all processing units may have non-removable functional portions. It is contemplated that even if the marking engine portion of the marking engine processing unit is non-removable, associated upper or forward paper paths 144 and 118 through each marking engine processing unit enables the marking engines to be taken "off-line" for repair or modification while the remaining processing units of the printing system continue to function as usual.

In some embodiments, separate bypasses for intermediate components may be omitted. The "bypass path" of the conveyor in such configurations suitably passes through the functional portion of a processing unit, and optional bypassing of the processing unit is effectuated by conveying the sheet through the functional portion without performing any processing operations. Still further, in some embodiments the printing system may be a stand-alone printer or a cluster of networked or otherwise logically interconnected printers, with each printer having its own associated print media source and finishing components including a plurality of final media destinations.

Although several media path elements are illustrated, other path elements are contemplated which might include, for example, inverters, reverters, interposers, and the like, as known in the art to direct the print media between the feeders, printing or marking engines and/or finishers.

The system controller 68 controls the production of printed sheets, the transportation over the media path, and the collation and assembly as job output by the finisher.

Figure 4A:
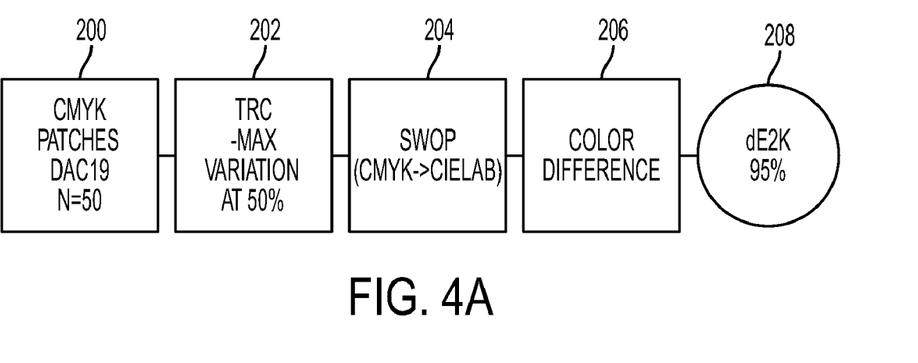
FIGS. 4A and 4B illustrate a simulation process to illustrate an IQC according to an exemplary embodiment of this disclosure.
Figure 4B:
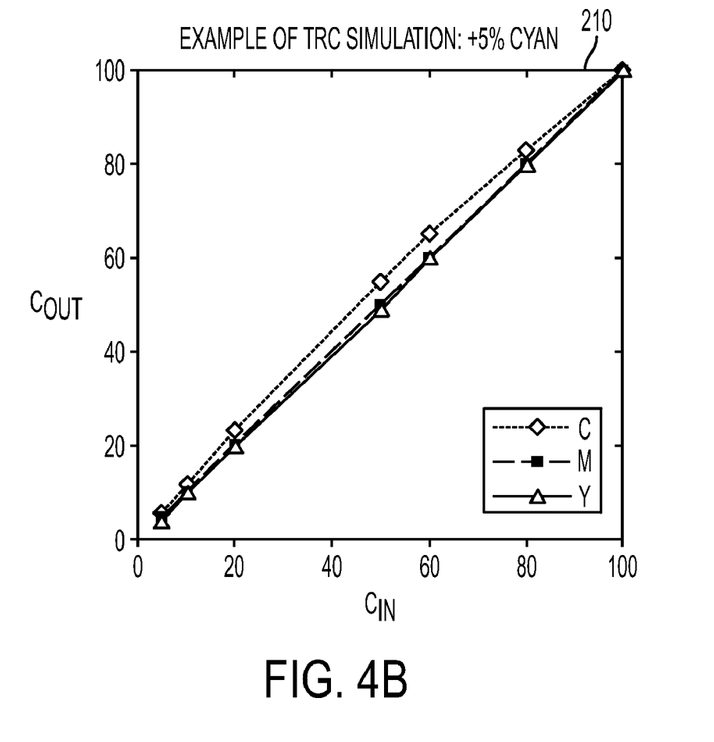

With reference to FIGS. 4A and 4B, illustrated are simulation results to apply TRC variation to a standard patch set, converting to CIE using SWOP.icc profile, and computing 95% color error in dE2K relative to standard SWOP. A set of 50 CMYK patch values were adjusted with a given TRC to a new C'M'Y'K' value. These values were then converted to CIELAB, and a color difference was computed between the adjusted and nominal values, resulting in a 95% percentile delta E2000 response. Table 1 displays the results of a 3% adjustment of CMY TRC's in all combinations. Note in Case 1 and Case 8, the IQC errors are of the same polarity and the color error is significantly less than Cases 2-7.

TABLE 1

Color difference results for % 3 CMY TRC variation. Lowest color error occurs when all three separations have errors with same polarity.

|   |     | C  | M  | Y  | DE2K |
|---|-----|----|----|----|------|
| 1 | NNN | −3 | −3 | −3 | 2    |
| 2 | NNP | −3 | −3 | 3  | 3.5  |
| 3 | NPN | −3 | 3  | −3 | 3.8  |
| 4 | NPP | −3 | 3  | 3  | 3.2  |
| 5 | PNN | 3  | −3 | −3 | 3.3  |
| 6 | PNP | 3  | −3 | 3  | 4.1  |
| 7 | PPN | 3  | 3  | −3 | 3.2  |
| 8 | PPP | 3  | 3  | 3  | 1.7  |

Figure 5:
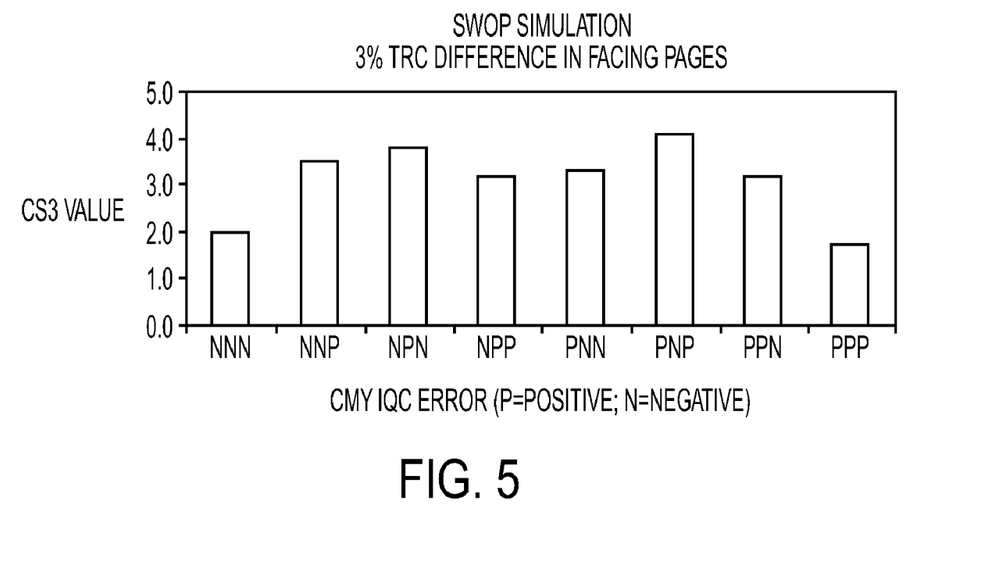
FIG. 5 illustrates the results of an IQC simulation according to an exemplary embodiment of this disclosure.

With reference to FIG. 5, illustrated is the color error improvement when CMY errors are of the same polarity.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of controlling hue variation associated with a first color IME (Image Marking Engine) and a second color IME having one or more substantially equivalent color separations, the method comprising:
   a) printing a control patch for each color separation associated with the first and second IMEs, the control patches associated with the actual rendering of respective target separation colors and based on a respective marking density correlated with the target separation colors;
   b) measuring color separation errors associated with the control patches relative to the respective target separation colors;
   c) determining a first color separation and a second color separation which define a respective maximum and minimum of an error range associated with color separation error differences between the first and second IMEs for each color separation; and
   d) decreasing the relative target color error associated with the first and second color separations by adjusting the marking density of the first and second color separations associated with the first and second IMEs by a fraction of the error range to decrease the color separation error range between the first and second IMEs.

2. The method of controlling hue variation according to claim 1, comprising:
   determining a color separation error envelope ENV_err for the first and second IMEs, the error envelope defining the limits of the error range for a plurality of target separation color densities associated with the first and second IMEs.

3. The method of controlling hue variation according to claim 2, the method comprising:
   comparing the color separation error envelope ENV_err to a color separation error envelope target ENV_tar; and
   performing step d) only if ENV_err is greater than ENV_tar.

4. The method of controlling hue variation according to claim 2, wherein step d) comprises:
   decreasing the marking density of the first color separation associated with the first IME by a value related to ENV_err and increasing the marking density of the first color separation associated with the second IME by a value related to ENV_err; and
   increasing the marking density of the second color separation associated with the first IME by a value related to ENV_err and decreasing the marking density of the second color separation associated with the second IME by a value related to ENV_err.

5. The method of controlling hue variation according to claim 2, wherein step d) comprises:
   decreasing the marking density of the first color separation associated with the first IME by ENV_err/4 and increasing the marking density of the first color separation associated with the second IME by ENV_err/4; and
   increasing the marking density of the second color separation associated with the first IME by ENV_err and decreasing the marking density of the second color separation associated with the second IME by ENV_err/4.

6. The method of controlling hue variation according to claim 1, wherein the control patches and target separation colors are mid-tones.

7. The method of controlling hue variation according to claim 1, wherein each IME includes four color separation colors.

8. The method of controlling hue variation according to claim 1, wherein, prior to performing step c), the method comprises:
    determining a color separation error difference between the first and second IMEs for respective color separation; and
    performing step c) and d) only if the color separation differences for each color separation are outside a predetermined range.

9. An image rendering system comprising:
    two or more color IMEs; and
    a controller operatively connected to the two or more color IMEs, the controller configured to execute the method comprising:
    a) printing a control patch for each color separation associated with the first and second IMEs, the control patches associated with the actual rendering of respective target separation colors and based on a respective marking density correlated with the target separation colors;
    b) measuring color separation errors associated with the control patches relative to the respective target separation colors;
    c) determining a first color separation and a second color separation which define a respective maximum and minimum of an error range associated with color separation error differences between the first and second IMEs for each color separation; and
    d) decreasing the relative target color error associated with the first and second color separations by adjusting the marking density of the first and second color separations associated with the first and second IMEs by a fraction of the error range to decrease the color separation error range between the first and second IMEs.

10. The image rendering system according to claim 9, wherein the controller is configured to execute the method comprising:
    determining a color separation error envelope ENV-err for the first and second IMEs, the error envelope defining the limits of the error range for a plurality of target separation color densities associated with the first and second IMEs.

11. The image rendering system according to claim 10, wherein the controller is configured to execute the method comprising:
    comparing the color separation error envelope ENV_err to a color separation error envelope target ENV_tar; and
    performing step d) only if ENV_err is greater than ENV_tar.

12. The image rendering system according to claim 10, wherein step d) comprises:
    decreasing the marking density of the first color separation associated with the first IME by a value related to ENV_err and increasing the marking density of the first color separation associated with the second IME by a value related to ENV_err; and
    increasing the marking density of the second color separation associated with the first IME by a value related to ENV_err and decreasing the marking density of the second color separation associated with the second IME by a value related to ENV_err.

13. The image rendering system according to claim 10, wherein step d) comprises:
    decreasing the marking density of the first color separation associated with the first IME by ENV_err/4 and increasing the marking density of the first color separation associated with the second IME by ENV_err/4; and
    increasing the marking density of the second color separation associated with the first IME by ENV_err and decreasing the marking density of the second color separation associated with the second IME by ENV_err/4.

14. The image rendering system according to claim 9, wherein the control patches and target separation colors are mid-tones.

15. The image rendering system according to claim 9, wherein each IME includes four color separation colors.

16. The image rendering system according to claim 9, wherein, prior to performing step c), the method comprising:
    determining a color separation error difference between the first and second IMEs for respective color separation; and
    performing step c) and d) only if the color separation differences for each color separation are within a predetermined range.

17. The image rendering system according to claim 9, wherein the controller is configured to execute the method comprising:
    reducing the color separation error differences between the first and second IMEs within the predetermined range, if the color separation error differences are greater than the predetermined range; and
    subsequently, performing steps c) and d).

18. A computer program product comprising:
    a non-transitory computer readable medium storing instructions that, when executed by a computer, cause the computer to perform a method of controlling hue variation associated with a first color IME and a second color IME having one or more substantially equivalent color separations, the method comprising:
    a) printing a control patch for each color separation associated with the first and second IMEs, the control patches associated with the actual rendering of respective target separation colors and based on a respective marking density correlated with the target separation colors;
    b) measuring color separation errors associated with the control patches relative to the respective target separation colors;
    c) determining a first color separation and a second color separation which define a respective maximum and minimum of an error range associated with color separation error differences between the first and second IMEs for each color separation; and
    d) decreasing the relative target color error associated with the first and second color separations by adjusting the marking density of the first and second color separations associated with the first and second IMEs by a fraction of the error range to decrease the color separation error range between the first and second IMEs.

19. The computer program product according to claim 18, wherein the method comprises:
  determining a color separation error envelope ENV_err for the first and second IMEs, the error envelope defining the limits of the error range for a plurality of target separation color densities associated with the first and second IMEs.

20. The computer program product according to claim 19, wherein the method comprises:
  comparing the color separation error envelope ENV_err to a color separation error envelope target ENV_tar; and
  performing step d) only if ENV_err is greater than ENV_tar.

21. The computer program product according to claim 19, wherein the method comprises:
  decreasing the marking density of the first color separation associated with the first IME by a value related to ENV_err and increasing the marking density of the first color separation associated with the second IME by a value related to ENV_err; and
  increasing the marking density of the second color separation associated with the first IME by a value related to ENV_err and decreasing the marking density of the second color separation associated with the second IME by a value related to ENV_err.

22. The computer program product according to claim 19, wherein the method comprise:
  decreasing the marking density of the first color separation associated with the first IME by ENV_err/4 and increasing the marking density of the first color separation associated with the second IME by ENV_err/4; and
  increasing the marking density of the second color separation associated with the first IME by ENV_err and decreasing the marking density of the second color separation associated with the second IME by ENV_err/4.

23. The computer program according to claim 18, wherein the control patches and target separation colors are mid-tones.

24. The computer program product according to claim 18, wherein each IME includes four color separation colors.

25. The computer program product according to claim 18, wherein, prior to performing step c), the method comprises:
  determining a color separation error difference between the first and second IMEs for respective color separation; and
  performing step c) and d) only if the color separation differences for each color separation are outside a predetermined range.

* * * * *